United States Patent [19]

Imamura

[11] 4,193,085
[45] Mar. 11, 1980

[54] APPARATUS FOR REMOVING JITTER IN COLOR TELEVISION SIGNAL

[75] Inventor: Makoto Imamura, Machida, Japan

[73] Assignee: Tokyo Shibaura Electric Co., Ltd., Kawasaki, Japan

[21] Appl. No.: 903,135

[22] Filed: May 5, 1978

[30] Foreign Application Priority Data

May 17, 1977 [JP] Japan ................................. 52-56801
May 17, 1977 [JP] Japan ................................. 52-56802

[51] Int. Cl.² ........................ H04N 5/795; H04N 5/08
[52] U.S. Cl. ...................................... 358/8; 358/155; 360/36
[58] Field of Search ................ 360/36, 37; 358/8, 153, 358/155

[56] References Cited

U.S. PATENT DOCUMENTS

| | | | |
|---|---|---|---|
| 3,312,780 | 4/1967 | Hurst et al. | 360/36 X |
| 3,769,449 | 10/1973 | Inoue | 358/8 |
| 4,074,307 | 2/1978 | Dischert et al. | 358/8 |
| 4,081,834 | 3/1978 | Takamiya et al. | 358/8 X |
| 4,126,886 | 11/1978 | Takahara et al. | 360/37 |

FOREIGN PATENT DOCUMENTS 50-14852 5/1975 Japan.
52-96818 8/1977 Japan.

OTHER PUBLICATIONS

Standard Specification of AVR-2 Automatic Video Tape Recorder, Toshiba Ampex Co., Ltd., Dec. 1974.
Jitter Correcting Device-Video Recording Study Meeting Data Number VRIT-1-M. Imamura, May 27, 1971.

Primary Examiner—Bernard Konick
Assistant Examiner—Donald McElheny, Jr.
Attorney, Agent, or Firm—Oblon, Fisher, Spivak, McClelland & Maier

[57] ABSTRACT

An apparatus for removing jitter in a color signal is provided with a record/play-back apparatus for recording and playing back a color television signal. The color television signal played back by the record/play-back apparatus is applied to a jitter detection device where a phase comparing signal is detected from the color television signal. The phase comparison signal is applied to a jitter correction device. A reference signal oscillator applies a reference signal to the jitter correction device. The phases between the phase comparing signal and the reference signal are compared in a phase comparator. The output signal of the phase comparator is applied to one of the input terminals of a variable delay circuit. A color play-back signal applied to the other input terminal of the variable delay circuit is time-delayed so that the jitter in the color play-back signal is corrected.

15 Claims, 22 Drawing Figures

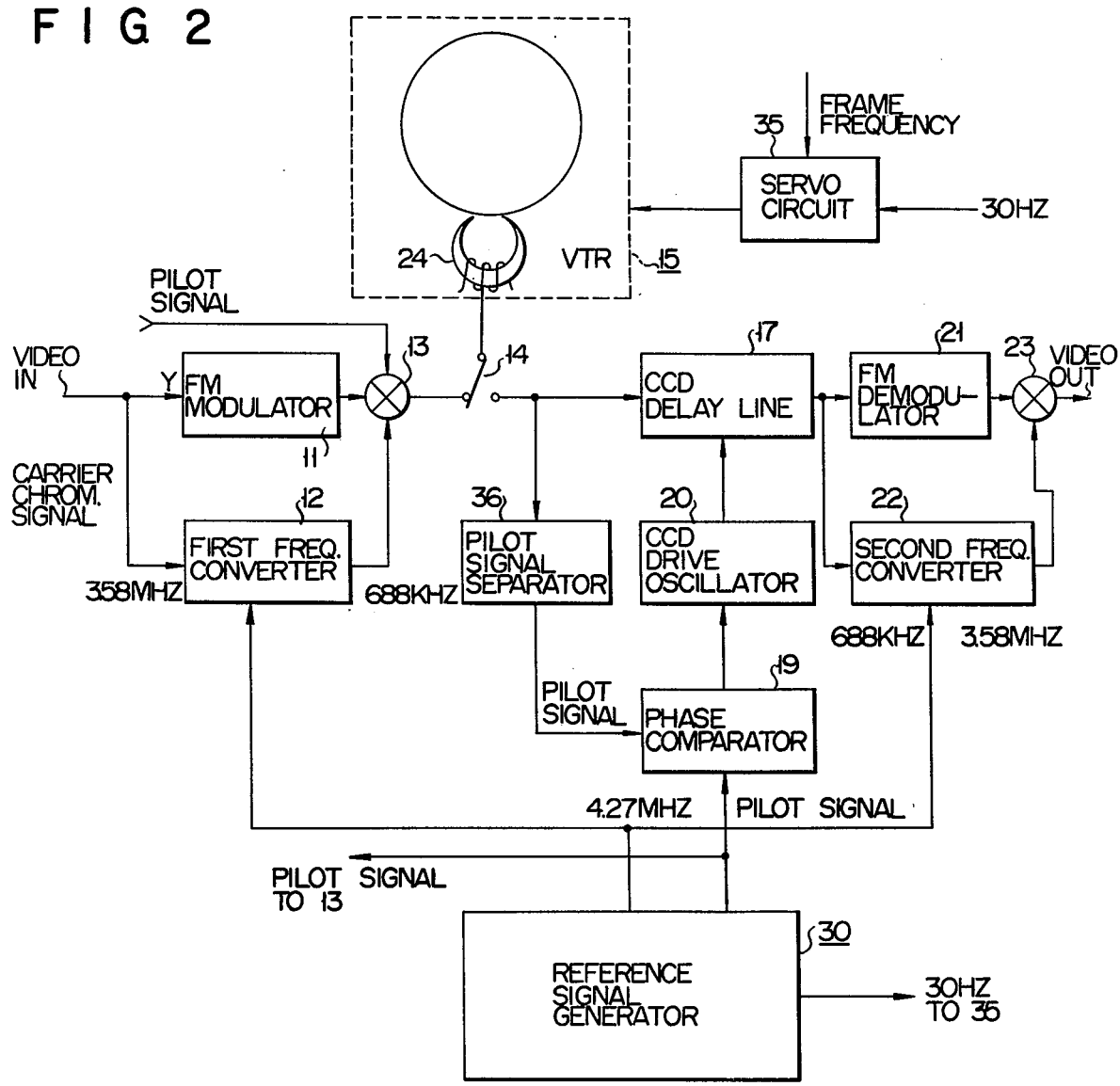
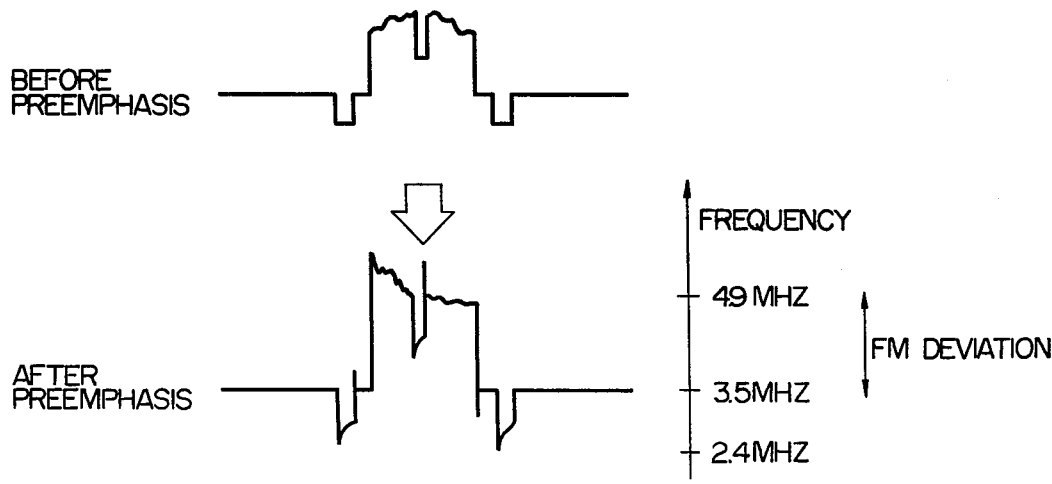

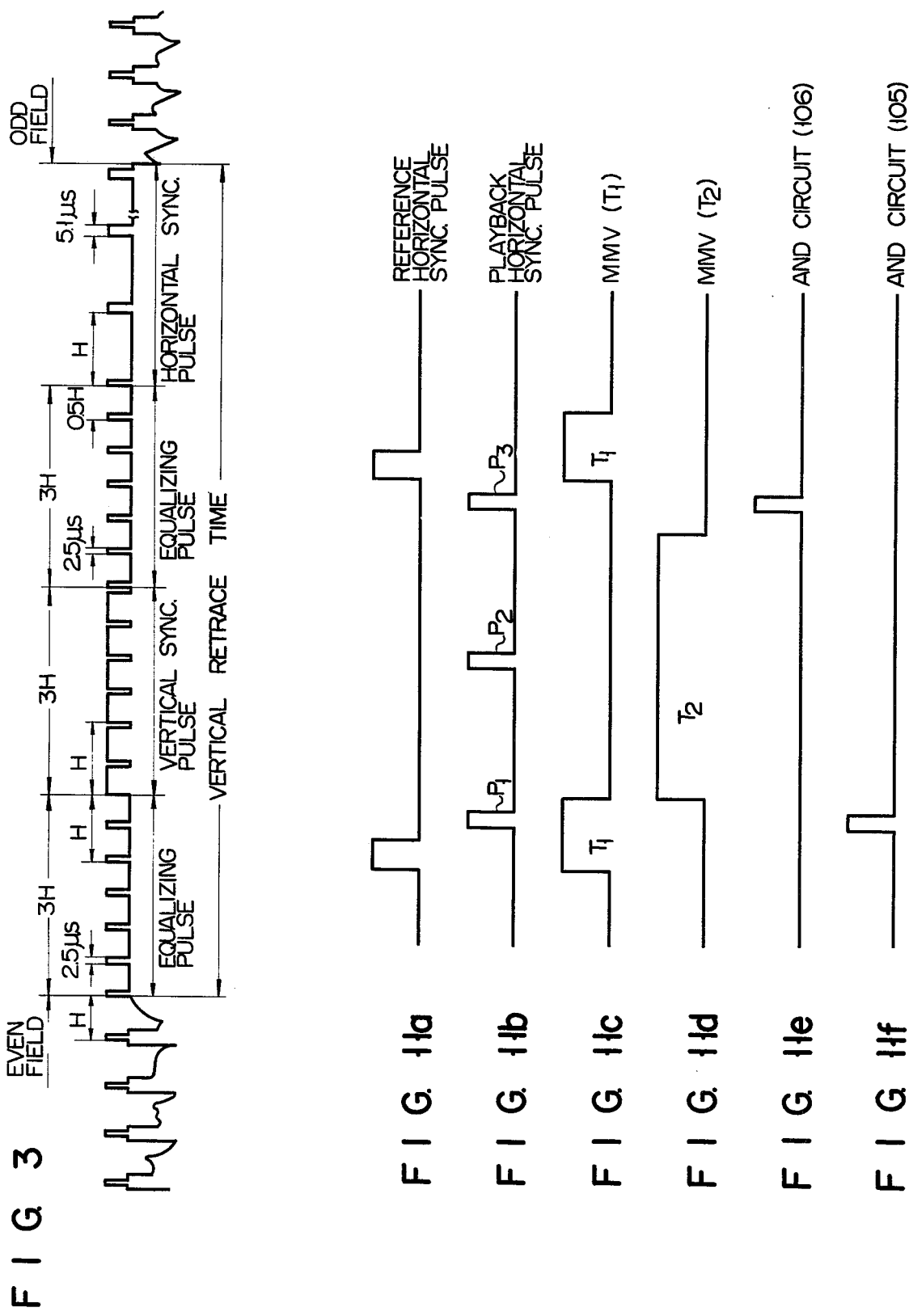

FIG. 6a TV SIGNAL 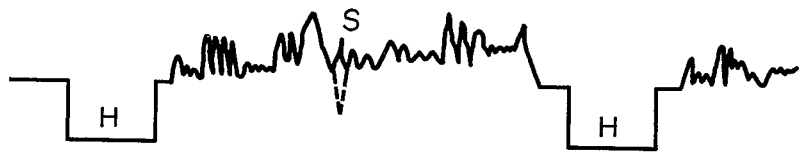
FIG. 6b HORIZONTAL SYNC. SIGNAL 
FIG. 6c FIRST PULSE SIGNAL 
FIG. 6d SECOND PULSE SIGNAL 
FIG. 6e JITTER DETECTION SIGNAL 
FIG. 7
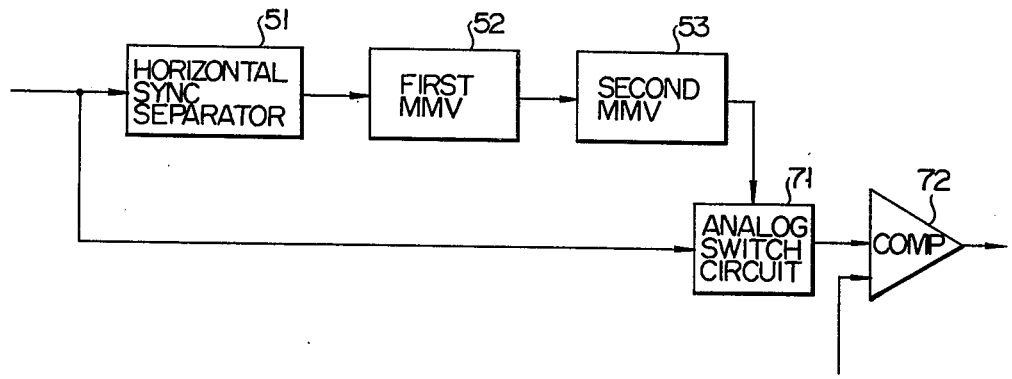
FIG. 8a TV SIGNAL 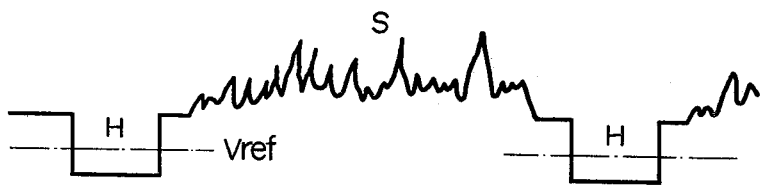
FIG. 8b ANALOG SWITCH SIGNAL 
FIG. 8c JITTER DETECTION SIGNAL 

APPARATUS FOR REMOVING JITTER IN COLOR TELEVISION SIGNAL

BACKGROUND OF THE INVENTION

The invention relates to an apparatus for removing jitter in a color television signal and, more particularly, an apparatus in which a time-axial variation component, called jitter, in a color television signal recorded by video tape recorder (VTR), for example, is detected and corrected.

Color television of the National Television System Committee (NTSC) is compatible with monochrome television. For this, this type color television broadcasting uses the same 6 MHz broadcast channels as monochrome transmission. In this color television system, color video signals, or R, G, B signals picked up by color television cameras are combined to convert the picture information into the luminance signal and chrominance signal. The luminance signal corresponds to the video signal in the monochrome television and is transmitted through the same 4.2 MHz channel as monochrome television. The chrominance signal includes only the color information of hue and chromaticity of a color. The chrominance signal is divided, in accordance with the visual perception of human, into the I signal (the bandwidth 1.5 MHz) and the Q signal (the bandwidth 0.5 MHz). These signals are superposed on a subcarrier 3.58 MHz and the superposed one is transmitted through the 6 MHz channel. The color television signal is composed of color video signals, horizontal and vertical synchronizing signals, and a chrominance subcarrier 3.58 MHz. This chrominance subcarrier is called a color burst 8 to 12 cycles superposed on the back porch of each horizontal synchronizing pulse after horizontal blanking period for demodulation of the television signal. The color burst synchronizes the phase of a subcarrier oscillator for demodulation.

In such a type color television signal, the hue depends largely on the phases of the color video signals. Accordingly, in order to secure a excellent color picture quality, the transmission system must have a good frequency characteristic and the circuit system must also permit correct and stable phase of the signal circuiting therein.

As described above, the color video signal includes the luminance signal for carrying the information contents of black and white picture and the chrominance signal resulting from the quadrature phase modulation of the chrominance subcarrier 3.58 MHz by color signals. There are some methods to record such a composite color video signal by a VTR. One of them is that, as in the monochrome television, the color video signal is frequency-modulated and the frequency-modulated one is directly recorded on a recording medium, i.e. a video tape. In this case, the frequency of the carrier wave must be high. However, it is difficult to manufacture record/play-back heads to record and play back such a high frequency signal. Therefore, the 3.58 MHz of the subcarrier is converted into a lower frequency in the frequency range of the VTR. The VTR employing such a method in general uses a rotary head. This type VTR suffers from jitter due to uneven rotation of the rotary head, extension or contraction of a video tape, speed variation in the video tape running, etc. The jitter frequency-modulates the chrominance subcarrier so that the 3.58 frequency band is instable with phase change. This leads to change of the hue of the play-back picture.

The jitter in recording and playing back the color video signal by the VTR has been corrected in the following manner. The luminance signal is frequency-modulated and the chrominance signal is converted into a signal with low frequency by using the subcarrier 3.58 MHz, in the record/play-back operation of the color video signal. The play-back color video signal including the jitter is divided into the luminance signal and the chrominance signal. The jitter included in the luminance signal is eliminated through a delay line. The jitter included in the chrominance signal is eliminated by a phase control circuit. This method is discussed in Japanese Patent Gazette No. 14852/75, for example.

In this correction method, the jitter is separately corrected in the luminance and chrominance signal processing circuits. Therefore, the jitter in the chrominance or luminance signal per se is eliminated but a phase difference is produced between them. This results in color edging of the play-back picture.

To overcome this disadvantage, another jitter correction method was proposed in which the horizontal synchronizing signal of a color television signal is phase-compared with the reference oscillating signal generated by a flywheel oscillator in the recording/play-back system and the result of the comparison is used for the jitter correction. As a video tape recorder employing this method, an automatic video tape recorder AVR-2 is enumerated which is manufactured by TOSHIBA AMPEX CO., Ltd. However, this type apparatus is defective in that the construction is complex and the cost is high, and that a high precision of the jitter detection can not be expected. Therefore, the play-back picture suffers color shading although it is slight. To sufficiently correct the residual jitter, the flywheel oscillator must be of very high precision. However, it is practically very difficult to manufacture such a high precision oscillator. Additionally, when skew distortion takes place, it is impossible to detect the jitter. None of the countermeasure has been taken for this problem.

SUMMARY OF THE INVENTION

Accordingly, an object of the present invention is to provide an apparatus for removing jitter in a color signal in which the jitter may be detected over a wide frequency range from low to high frequencies and a large jitter due to skew distortion may be detected and corrected to a sufficient degree and therefore good picture quality is secured without no color edging.

To achieve this object, there is provided an apparatus for removing jitter in a color signal comprising: a record/play-back device for recording a color television signal on the basis of a reference signal; a jitter detection device for detecting a phase detection signal from a play-back color television signal played back by the record/play-back device; a jitter correction device in which the phase detection signal detected by the jitter detection device is phase-compared with the reference signal and the reproduction signal is time-delayed by a variable delay circuit on the basis of the result of the phase-comparing; and a reference oscillator for providing the reference signal to the record/play-back device and the jitter correction device.

With such a construction, the recording and playing back of the color television signal are performed on the basis of the reference signal so that there is eliminated change of signal state in the recording and playing back.

Therefore, no jitter takes place in low frequencies and thus the frequency of the chrominance subcarrier is kept constant. The jitter included in high frequency components is detected through the phase comparison of the phase comparison signal derived from the playback signal and the luminance signal and the chrominance signal are both delayed depending on the detection result. This eliminates the phase difference between the luminance and chrominance signals. As a result, the color shading or color edging in the play-back picture is removed. The jitter correction is made over a wide range of frequency so that the jitter due to skew distortion may be corrected without any special circuit.

BRIEF DESCRIPTION OF THE DRAWINGS

FIG. 2 shows a block diagram of another apparatus for removing jitter of a color signal according to the invention;

FIG. 3 shows a construction of a television signal and its wave form;

FIG. 4 illustrates the relation between FM deviation and emphasis;

FIG. 6, consisting of 6a–6e, shows a set of timing diagrams useful in explaining the operation of the jitter detection device;

FIG. 7 shows a block diagram of still another embodiment of the jitter detection device;

FIG. 8, consisting of 8a–8c, shows wave forms for illustrating the operation of the jitter detection device;

FIG. 11a–11f shows a set of wave forms for illustrating the operation of the reference oscillator shown in FIG. 10.

DESCRIPTION OF THE PREFERRED EMBODIMENTS

Figure 1:
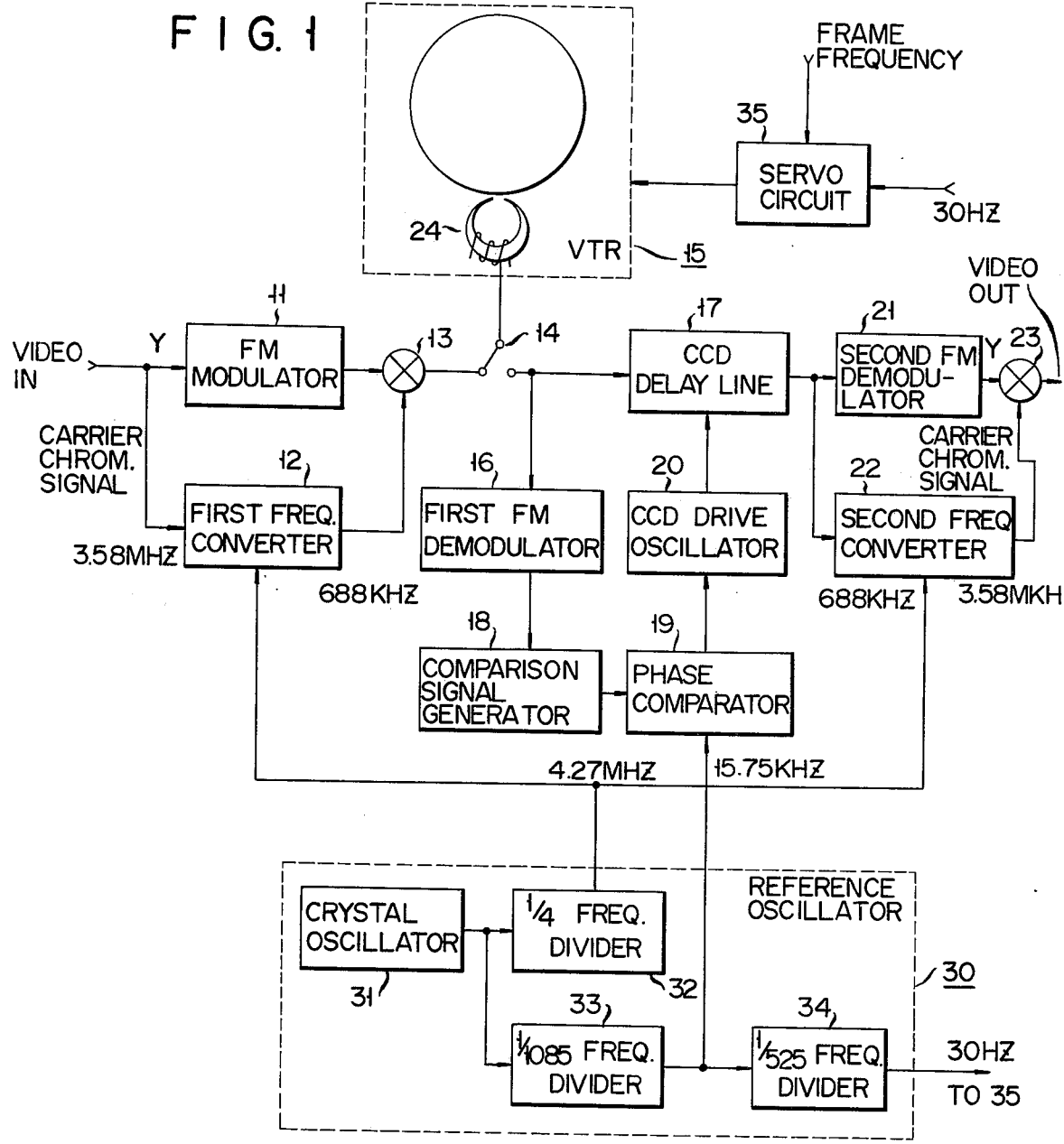
FIG. 1 shows a block diagram of an apparatus for removing jitter of a color signal according to the invention.

Reference is made to FIG. 1 illustrating an apparatus for removing jitter of a color signal according to the invention. As shown, a first FM modulator 11 and a first frequency converter 12 are coupled at the output terminals with an adder circuit 13. The adder circuit 13 is connected at the output to a recording head 24 of a VTR 15, through a switch 14. These circuits 11, 12, 13, 14 and 15 constitute a color signal record/play-back device. A play-back head of the VTR 15 is coupled with the output terminal of a first FM demodulator 16 through the switch 14 and with an input terminal of a charge coupled device (CCD) delay line 17 partly constituting a jitter correction circuit. The delay line 17 may comprise also a surface wave line or a LC delay line. The output terminal of the first FM demodulator 16 is connected to the input terminal of a phase comparing signal generator 18 constituting a jitter detection device. The phase comparing signal generator 18 is comprised of a synchronizing signal separator, for example. The output terminal of the synchronizing signal separator 18 is coupled with one of input terminals of the jitter correction device. In other words, in the jitter correction device, the synchronizing signal separator 18 is connected at one end to one of the input terminals of a phase comparator 19 of which the output terminal is connected to an input terminal of a CCD drive oscillator 20. The CCD drive oscillator 20 is connected at the output terminal to the input terminal of the CCD delay line 17. The CCD delay line 17 is connected at one output terminal to a second demodulator 21 constituting the color signal record/play-back device while at the other output terminal to an input terminal of a second frequency converter 22. The output terminal of the second frequency converter 22 is connected to one of the input terminals of an adding circuit 23 of which the other input terminal is connected to the output terminal of the second FM demodulator 21.

A reference oscillator 30 comprises a crystal oscillator 31, ¼ frequency divider 32, 1/1085 frequency divider 33, and a 1/525 frequency divider 34. The crystal oscillator 31 is connected at the output terminal to the ¼ frequency divider and the 1/1085 frequency divider 33. The output terminal of the ¼ frequency divider 22 is connected to the input terminal of the first frequency converter 12 and to the input terminal of the second frequency converter 22. The output terminal of the 1/1085 frequency divider 33 is connected to the phase comparator 19 and to the 1/525 frequency divider 34. The 1/525 frequency divider 34 is connected to a servo circuit 35 which also is connected to the VTR 15. These frequency dividers 32 to 34 may be constructed by ordinary flip-flops.

The explanation to follow is the operation of the above-mentioned embodiment of the apparatus for removing a color signal.

A color video signal transmitted from the industrial television (ITV) or an antenna is separated into a luminance signal and a carrier chrominance by a color television signal separator (not shown). The luminance signal is applied to the first FM modulator 11 where it is FM-modulated. The carrier chrominance signal with a frequency characteristic of 3.58 MHz is applied to the first frequency converter 12 where it is converted into a signal with low frequency 688 KHz, by the output signal of 4.27 MHz from the ¼ frequency divider 32. The output signals from the first FM modulator 11 and the first frequency converter are applied to the adder 13 where these are summed. The summed signal therefrom is applied to the recording head 24 of the VTR 15 to be recorded thereby. The VTR 15 comprises a capstan servo, head servo and the like. A frame frequency 30 KHz separated from the color television signal by a circuit (not shown) is used as a reference frequency in the VTR 15. That is, the capstan servo or the head servo are controlled by the reference frequency 30 KHz, so that the jitter in low frequencies at the recording may be removed.

The color video signal recorded by the VTR is reproduced by the play-back head. The reproduced signal is applied to the CCD delay line 17 and the second FM demodulator 21 through the switch 14. The color television signal demodulated by the second demodulator 21 is applied to the synchronizing signal separator 18 where a horizontal synchronizing signal is separated from the color television signal demodulated. The horizontal synchronizing signal separated is applied to the phase comparator 19. The phase comparator 19 has received the reference frequency signal of 15.75 KHz, i.e. the horizontal scanning frequency, outputted from the 1/1085 frequency divider 33 of the reference oscillator 30. Accordingly, in the phase comparator 19, the horizontal synchronizing signal is compared with the reference frequency signal. The output signal of the phase comparator 19 is then applied to the CCD drive oscillator 20. The CCD drive oscillator 20 produces an output signal with the frequency corresponding to an input voltage thereto. The output signal is applied to the CCD delay line 17. At this time, the CCD delay line 17 has received a color television signal reproduced by the play-back head. The color television signal is delayed depending on the phase difference between both the signals. The delayed color television signal is separated into the luminance signal and the carrier chrominance signal, by a television signal separation circuit (not shown). The luminance signal is applied to the second FM demodulator 21 where it is demodulated. The carrier color signal is applied to the second frequency converter 22. At this time, a signal of 4.27 MHz outputted from the ¼ frequency divider 32 in the reference oscillator 30 has already been applied to the second frequency converter 22. By this frequency signal, the carrier chrominance signal of 688 KHz is converted into the frequency signal of 3.58 MHz. The luminance signal and the carrier chrominance signal are applied to the adder 23 where these are summed to remove the jitter from the reproduction color video signal.

Referring now to FIG. 2, there is shown another embodiment of the invention. Like reference numerals are used to designate like portions or equivalents in FIG. 1.

As shown in FIG. 2, the output terminals of the first FM modulator 11 and the first frequency converter 12 are applied to the adder 13. The output terminal of the adder 13 is connected to the magnetic recording head 24 of the VTR through the switch 14. The output terminal of the play-back head of the VTR is connected through the switch 14 to a pilot signal separator 36 which is a phase comparing signal detector and to the output terminal of the CCD delay line 17. The output terminal of the separator 36 is connected to the input terminal of a phase detector 19 constituting the jitter correction device. The output terminal of the phase detector 19 is connected to the input terminal of the CCD drive oscillator 20 of which the output terminal is connected to the control terminal of the CCD delay line 17. The output terminal of the CCD delay line 17 is connected to the input terminal of the second FM demodulator 21 and to the input terminal of the second frequency converter 22. The output sides of the second FM demodulator 21 and the second frequency converter 22 are connected to the input terminal of the adder 23.

The reference signal generator 30 is connected at one output terminal to the control terminals of the first and second frequency converters 12 and 22 and at the other terminal to the control terminals of the phase comparator 19 and the first adder 13. The reference oscillator 30 is further connected to the servo circuit 35.

In operation, the color television signal is separated into a luminance signal and a carrier chrominance signal, by a television signal separator (not shown). The luminance signal is frequency-modulated by the frequency modulator 11 and then is applied to the first adder 13. On the other hand, the carrier chrominance signal of 3.58 MHz is converted into a signal with 688 KHz by the first frequency converter 12, on the basis of the reference frequency signal of 4.27 MHz. The converted signal of 688 KHz is applied to the first adder 13. Additionally, the pilot signal from the reference signal generator 30 is applied to the adder 13. Accordingly, the pilot signal is superposed on the carrier chrominance signal and the luminance signal and the superposed one is recorded by the video recording head 24 of the video recording/play-back apparatus 15.

A reproduction pilot signal is separated from the reproduced color television signal by the pilot signal separator 36. The pilot signal separated is applied to the phase comparator 19. A reference pilot signal from the reference signal generator 30 has been applied to the phase comparator 19. In the phase comparator 19, the reproduction pilot signal is phase-compared with the reference pilot signal. The result of the comparison is applied to the drive oscillator 20. The CCD drive oscillator so operates as to drive the CCD delay line 17 in accordance with the voltage inputted. The color television signal reproduced by the VTR has been applied to the CCD delay line 17. Accordingly, the CCD delay line delays the reproduced color television signal in accordance with the phase difference between the pilot signal reproduced and the reference pilot signal. The phase difference included in the color television signal is obtained through this phase difference. The color television signal is separated into a luminance signal and a carrier chrominance signal by a color television signal separator (not shown). The luminance signal is frequency-demodulated by the second frequency demodulator 21. The carrier chrominance signal is converted into a signal of 3.58 MHz by the second frequency converter 22. The output signals of these circuits 21 and 22 are applied to the adder 23 for jitter elimination.

The color television signal is composed of a video signal, horizontal and vertical synchronizing signals and an equalizing signal shown in FIG. 3. When such a television signal is recorded on a video tape of a video tape recorder, for example, the recorded television signal is preemphasized in order to improve the signal to noise ratio (S/N).

Generally, in a voice signal, the amplitude in high frequencies is lower than that in low frequencies. In the case of low amplitude, the S/N is poor. As known, in the FM system, a large modulation index Mf bring about good S/N. The modulation index Mf is expressed by an equation $Mf = \Delta f/fm$ where fm is the modulation frequency and $\Delta f$ is frequency deviation. This equation shows that, the higher the modulation fm, the smaller the modulation index Mf, i.e. the poorer the S/N. The frequency deviation $\Delta f$ is proportional to the amplitude of the modulation signal. Accordingly, when the frequency becomes larger and the amplitude is smaller, the frequency deviation $\Delta f$ is small. With this, the modulation factor Mf is also small and then the S/N is deteriorated.

It is for this reason that, in the frequency modulation, the high frequency region of the modulating signal is excessively emphasized in the modulation. FIG. 4 shows the relation of the television signal and its frequency band. As seen from the figure, the wave form after preemphasis posses distinctive overshoot and undershoot and the amplitude of it at the leading edge exceeds the specified range of the frequency deviation. It is common that, in order to obtain good S/N, the range of the frequency deviation is generally set up 3.5 to 4.9 MHz.

Figure 5:
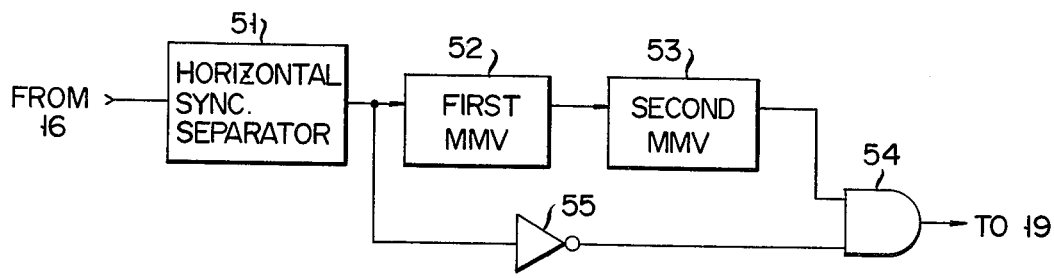
FIG. 5 shows a block diagram of another embodiment of a jitter detection device.

Another embodiment of the jitter detection device will be shown in FIG. 5. As shown, the jitter detection device is comprised of a horizontal synchronizing separator 51, first and second monostable multivibrators (MMV) 52 and 53, an inverter 55, and an OR gate 54.

The first and second MMVs 52 and 53 are series-connected. The horizontal synchronizing separator 51 is connected at the input side to the first frequency demodulator 16 and at the output side to the first MMV 52 and to one input terminal of the AND gate 54 through the inverter 55. The other input terminal of the AND gate 54 is connected to the second MMV 53. The AND gate 54 is connected at the output terminal to the phase comparator 19.

The operation of the jitter detection circuit will be given referring to FIG. 6. FIG. 6a shows a reproduced color television signal composed by a horizontal synchronizing signal H and a video signal S. The composite video signal is applied to the horizontal synchronizing separator 51. The output signal of the horizontal synchronizing separator 51 is shown in FIG. 6b, and is applied to the first MMV 52. In response to the leading edge of the separated horizontal signal, the first MMV 52 produces a first pulse as shown in FIG. 6c of which the trailing edge in turn triggers the second MMV 53 to produce a second pulse as shown in FIG. 6d. The second pulse from the second MMV 53 is applied to the AND gate 54. As a result, the AND gate 54 produces a jitter detection signal as shown in FIG. 6e.

As shown, each jitter pulse rises at the trailing edge of the horizontal signal and falls off at the trailing edge of the second pulse of the second MMV 53. Therefore, there is completely eliminated an erronous operation of the jitter detection device due to a spike included in the video signal. Further, it is possible to detect a large jitter due to skew distortion. When a spike is included as indicated by dotted line, the detection range for the trailing edge is predetermined as mentioned above so that an erronous detection of the spike of a video signal is eliminated. Particularly, a retriggerable multivibrator instead of the first MMV 52 is effective in the spike removal effect. In the above-mentioned embodiment, the jitter detection signal was of digital but the jitter may be detected in the form of analogue signal.

This will be elaborated referring to FIG. 7. In FIG. 7, a horizontal synchronizing separator 51, a first and a second MMV are series-connected in this order. An output signal of the frequency demodulator (not shown) is applied to the horizontal synchronizing separator 51 and to an analogue switch 71. The output side of the second MMV 53 is coupled with the control terminal of the analogue switching circuit 71. The output of the analogue switch circuit 71 is applied to one of the input terminals of a voltage comparator 72. The other input terminal of the voltage comparator 72 is coupled with the output of a reference signal generator (not shown).

In operation, a color television signal shown in FIG. 8a is applied to the horizontal synchronizing separator 51 and the analogue switch circuit 71. The horizontal synchronizing separator 51 separates the horizontal synchronizing signal from the reproduced color television signal. The horizontal synchronizing signal triggers the first MMV 52 and the output signal of the first MMV 52 then triggers the second MMV 53. The output signal of the second MMV 53 is applied to the control terminal of the analogue switch circuit 71. Upon receipt of the output of the second MMV 53, the analogue switch circuit 71 is enabled since the switch 71 has received the reproduced color television signal from the frequency demodulator (not shown). As a result, the reproduced color television signal shown in FIG. 8a passes through the analogue switch 71 to the comparator 72. In the voltage comparator, the output signal voltage shown in FIG. 8b from the analogue switch circuit 71 is compared with the reference voltage fed thereto through the other input terminal of the comparator 72. As a result of the voltage comparison, a jitter detection signal appears at the output terminal of the comparator 72, as shown in FIG. 8c.

With the above-mentioned construction, the jitter is detected by using the trailing edge of the horizontal synchronizing signal so that the system is resistive to the adverse effect of the video signal due to the preemphasis and that the video signal after preemphasis does not exceed largely at the leading edge the specified range of the frequency deviation. The result is improvements of S/N and of the jitter detection precision. Additional useful effects are elimination of troubles due to beats and of arising due to deterioration of sampling.

Further, when the timing of the pulse signal for detecting the trailing edge is selected 0.04 H to 0.5 H, it is possible to detect only the trailing edge correctly positioned. Additionally, the equalizing pulse signal may be positioned outside the detection range of the trailing edge. Thus, there is no possibility of erronous operation due to the equalizing pulse. Incidentally, the symbol "H" indicates one horizontal scanning period which is approximately 63.5 μsec. in the television standard. The equalizing pulse signal may also be automatically eliminated. Furthermore, if necessary, correction in the equalizing pulse period may be made by using the leading edge of the horizontal synchronizing pulse.

Figure 9:
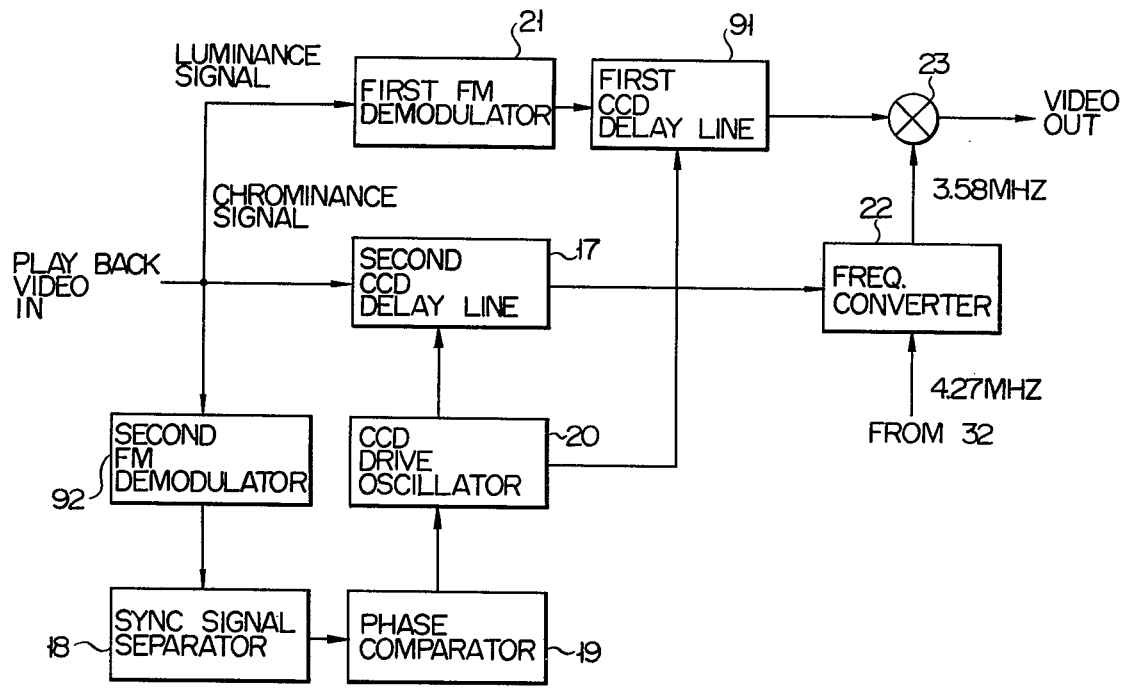
FIG. 9 shows a block diagram of another embodiment of a jitter correction device.

Referring now to FIG. 9, there is shown a jitter correction device for correcting the play-back color signal on the basis of the detection signal obtained by the jitter detection signal.

In the figure, a first frequency demodulator 21 for demodulating the luminance signal in the play-back color television signal is applied to one of the input terminals of an adder 23, through a first CCD delay line 91. The play back video signal also is applied to a frequency converter 22, through a second CCD delay line 17. Additionally, the play-back video signal is applied to a second frequency demodulator 32 where it is demodulated and the demodulated one is applied to a synchronizing signal separator 18. The output of the synchronizing signal separator 18 is coupled with a phase comparator 19 which is connected at the output to a CCD drive oscillator 20. The outputs of the CCD drive oscillator 20 are coupled with control lines of the first and second CCD delay lines 91 and 17. The output of the frequency converter 22 which receives the output signal of 4.27 MHz from the ¼ frequency divider 32, in addition to the output signal from the second CCD delay line 17, is applied to the other input terminal of the adder 23. The first and the second delay line 91, 17 may comprise also the surface delay lines or the LC delay lines.

The play-back color video signal is demodulated by the second frequency demodulator 92 and then the horizontal synchronizing signal is separated from the demodulated one by the horizontal synchronizing separator 18. The horizontal synchronizing signal separated is then applied to the phase comparator 19. In the phase comparator 19, the horizontal synchronizing signal is phase-compared with the reference frequency signal 15.75 KHz (horizontal scanning frequency) from the reference signal generator 30. The result of the comparison is applied to the CCD drive oscillator 20. Upon receipt of the phase-compared signal, the CCD drive oscillator 20 applies control signals to the first and second CCD delay lines 91 and 17.

As shown, the demodulated luminance signal from the first FM demodulator 21 is applied to the first CCD delay line 91 and the carrier chrominance signal, to the second CCD delay line 17. Through these delay lines, these signals are delayed at a predetermined time so that the jitter is corrected. The carrier chrominance signal outputted from the CCD drive oscillator 17 is frequency-converted by the frequency converter 22 from 688 KHz to 3.58 MHz. Then, the frequency-converted one is applied to the adder 23. The luminance signal delayed is applied to the same adder 23 where these signals are summed and the one is outputted as a color video signal without jitter.

From the foregoing, it will be seen that this embodiment may obtain the useful effects as the FIG. 1 embodiment attains and may improve the S/N of the luminance signal and the carrier chrominance signal.

Figure 10:
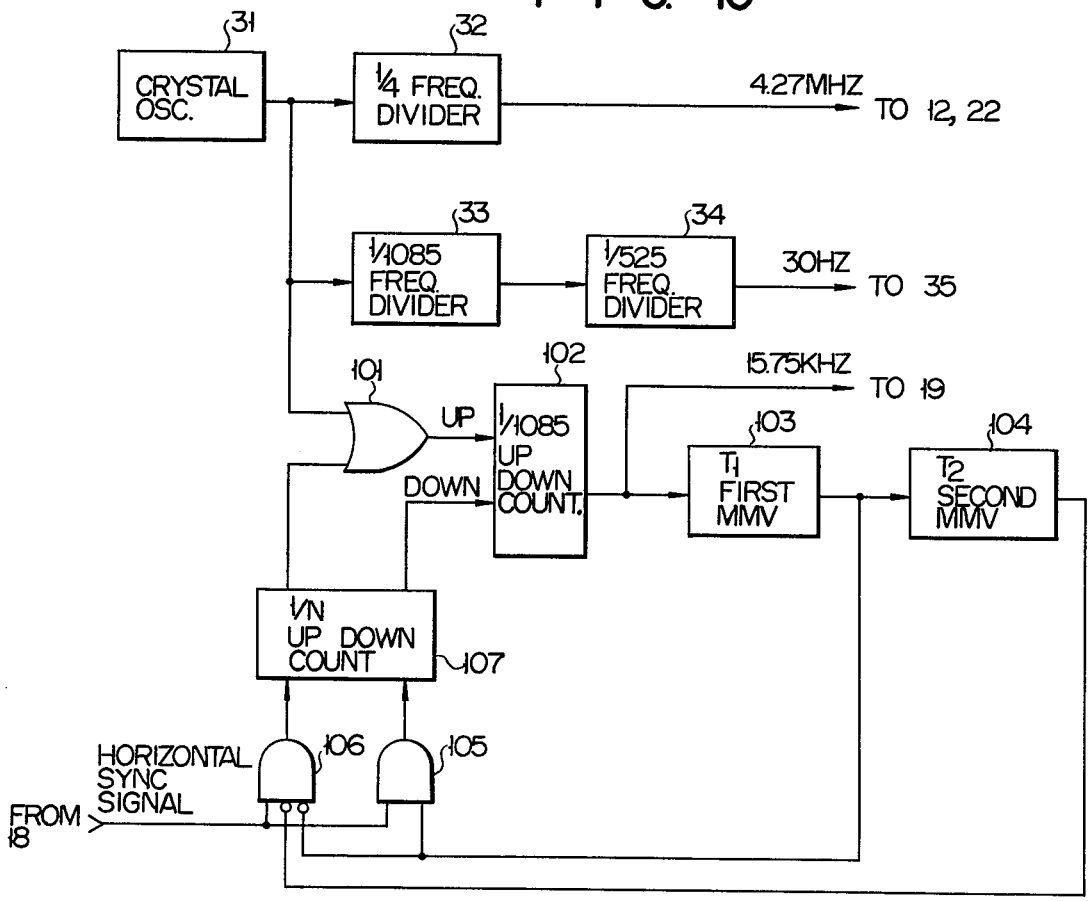
FIG. 10 shows a block diagram of another embodiment of a reference oscillator.

Turning now to FIG. 10, there is shown a modification of the reference signal oscillator. As shown, the output terminal of the crystal oscillator 31 is connected to the input of the ¼ frequency divider 32 and the input of the 1/1085 frequency divider 33, and to one of the input terminals of an OR gate 101.

The output terminal of the ¼ frequency divider 32 is connected to the input terminals of the first and second frequency converters 12 and 22 shown in FIG. 1. The output terminal of the 1/1085 frequency divider 33 is connected to the input terminal of the 1/525 frequency divider 34 of which the output terminal connected to the input terminal of the servo circuit 35. The output terminal of the OR circuit 101 is connected to the UP input terminal of the 1/1085 up/down counter 102. The output terminal of the counter 102 is applied to the input terminal of a first monostable multivibrator 103. The output of the first MMV 103 is applied to the input of the second MMV 104, one of the input terminals of an AND gate 105, and one of the input terminals of a AND gate circuit 106. The output terminal of the second MMV 103 is connected to another input terminal of the AND gate 106. The output terminal of the AND gate 106 is connected to the UP input terminal of a 1/N up/down counter 107. The output terminal of the AND gate 105 is connected to the DOWN terminal of the 1/N up/down counter 107. The UP output terminal of the 1/N up/down counter 107 is coupled with the other input terminal. The DOWN output terminal of the 1/N up/down counter 107 is connected to the DOWN input terminal of the 1/1085 up/down counter 102.

In operation, the output signal of the crystal oscillator 31 is applied to the ¼ frequency divider 32 where it is frequency-divided into a signal of 4.27 MHz. The reference signal is applied to the first and second frequency converters 12 and 22 as in the FIG. 1 example. The output signal of the crystal oscillator 31 is applied to the 1/1085 frequency divider 33 where it is frequency-divided. The frequency-divided signal is further frequency-divided by the 1/525 frequency divider 34. The frequency divider 34 produces a reference frequency signal 30 KHz. The reference frequency signal is applied to the input terminal of the servo circuit 35 in FIG. 1. The output signal of the crystal oscillator 31 is applied to one of the input terminals of the OR gate 101.

Assume now that a horizontal synchronizing signal exists at a position P1 in FIG. 11. In this case, the reference horizontal synchronizing pulse must be advanced in phase. At this time, a logical state "1" of the output signal of the first MMV 103 is applied to the AND gate 105. Additionally, a logical state "0" which is an inverse of the logical "1" is applied to the AND gate 106. The output signal of the second MMV 104 is in "OFF" state, i.e. logical "0". The inversed signal, i.e. logical "1", is applied to the AND gate 106. The play-back synchronizing signal P1 is applied to the input terminals of the AND gate 105 and the AND gate 106. As a result, the AND gate 105 produces an output signal of "1" and the AND gate 106 produces an output signal of "0". That is, these signals "0" and "1" are applied as up and down signals to the 1/N up/down counter 107. In response to these signals, the counter 107 produces a borrow signal to the DOWN terminal of the 1/1085 up/down counter 102. As a consequence, the frequency signal outputted from the 1/1085 up/down counter 102 becomes large so that the phase of the reference horizontal synchronizing pulse advances to coincide with the phase of the play-back horizontal synchronizing signal.

When the horizontal synchronizing signal appears at a position P3, the reference horizontal synchronizing signal must lag in phase behind the play-back horizontal synchronizing signal. At this time, the output signal of the first MMV 103 is in logical state "0" and is applied to one of the input terminals of the AND gate 105, and the signal of logical "1" is applied to the input terminal of the AND gate 106. Additionally, the play-back horizontal synchronizing signal is applied to the AND gate 105 and the AND gate 106. As a result, the AND gate 106 produces an up-signal which is in turn applied to the 1/N up/down counter 107. In response to this, the counter 107 produces a carry signal which is then applied to the UP terminal of the 1/1085 up/down counter 102, through the OR gate 101. As a consequence, the frequency of the reference horizontal synchronizing pulse becomes small and its phase is delayed to coincide with the phase of the play-back horizontal synchronizing signal.

Obviously other modifications and variations of the invention are possible in the light of the above teachings. It is therefore to be understood that within the scope of the appended claims the invention may be practiced otherwise than as specifically described.

What is claimed is:

1. An apparatus for removing jitter in a color signal comprising: means for modulating a luminance signal; first frequency converting means for converting a chrominance signal into a low frequency signal on the basis of a first reference signal; video signal record/play-back means in which signals outputted from said modulating means and frequency converting means are summed in an adder and the summed signal is recorded on a recording medium on the basis of a second reference signal; jitter detection means for detecting a comparing signal from a color signal played back by said record/play-back means; jitter correction means in which said comparing signal and a third reference signal are phase-compared and said play-back color signal is time-delayed on the basis of the result of the comparison; means for demodulating the luminance signal of said play-back color signal jitter-corrected by said jitter correction means; second frequency converting means converting the chrominance signal of said play-back color signal jitter corrected into a high frequency signal on the basis of said first reference signal; and means for generating first, second and third reference signals.

2. An apparatus for removing jitter in a color signal according to claim 1, in which said jitter detection means comprises: a synchronizing signal separation circuit for separating a horizontal synchronizing signal from the color signal played back by said record/play-back means; a first monostable multivibrator for outputting a first pulse at the leading edge of said horizontal synchronizing signal inputted thereto; a second monostable multivibrator for producing a second pulse at the trailing edge of the first pulse; and a logic circuit which is coupled at one input with the second pulse and at the other input with the horizontal synchronizing signal through an inverter and which produces a comparing signal at the trailing edge of the horizontal synchronizing signal.

3. An apparatus for removing jitter in a color signal according to claim 1, in which said jitter detection means comprises: a synchronizing signal separation circuit for separating a horizontal synchronizing signal from the color signal played back by said record/play-back means; a first monostable multivibrator for outputting a first pulse at the leading edge of said horizontal synchronizing signal inputted therein; a second monostable multivibrator for producing a second pulse at the trailing edge of the first pulse; an analogue switch which is connected at one input with the second pulse and at the other input with the play-back color signal and which produces the play-back color signal in response to the second pulse; and a voltage comparator which is coupled at one input terminal with the output signal from said analogue switch and at the other input terminal a reference signal and both the signals are voltage-compared and produces a comparing signal on the basis of the result of the comparing.

4. An apparatus for removing jitter in a color signal according to claim 1, in which said jitter detection means comprises: a pilot signal separation circuit for separating a pilot signal from the color signal played back by said video signal record/play-back means; and a logic circuit for producing a comparing signal at the trailing edge of said pilot signal separated.

5. An apparatus for removing jitter in a color signal according to claim 1, in which said jitter correction means comprises: a phase comparator which is coupled at one input terminal with a comparing signal from said jitter detection means and at the other input terminal with a reference frequency signal outputted from said reference signal generating means and which compares the phases of both the signals; and a variable delay circuit which is coupled with the output signal from said phase comparator and delays the play-back color signal including jitter in accordance with the output voltage of said output signal.

6. An apparatus for removing jitter in a color signal according to claim 5, in which said variable delay circuit is a charge coupled device.

7. An apparatus for removing jitter in a color signal according to claim 1, in which said reference signal generating means comprises: a crystal oscillator; a $\frac{1}{4}$ frequency divider which frequency-divides the frequency of the output signal from said crystal oscillator into $\frac{1}{4}$ and provides a reference frequency signal to first and second frequency converters which convert the chrominance signal into low or high frequency signals when the color video signal is recorded or played back by said record/play-back means; a 1/1085 frequency divider which frequency-divides the frequency of the output signal from said oscillator into 1/1085 and provides a reference signal to said phase comparator; and a 1/525 frequency divider which frequency-divides the frequency of the output signal from said 1/1085 frequency divider into 1/525 and provides a reference signal to the servo circuit of said record/play-back means.

8. An apparatus for removing jitter in a color signal according to claim 1, in which said jitter correction means comprises: a phase comparator which is coupled at one input with a comparing signal detected by said jitter detection means and at the other input with a reference signal and compares the phases of both the signals; a first variable delay circuit which is coupled with the luminance signal demodulated by said modulating means and delays the luminance signal by a predetermined time on the basis of the output signal from said phase comparator; and a second variable delay circuit which is coupled with the chrominance signal of said play-back video signal and delays the chrominance signal by a predetermined time on the basis of the output signal of said phase comparator.

9. An apparatus for removing jitter in a color signal according to claim 8, in which said first and second variable delay lines are each comprised of a charge coupled device delay line and an oscillator for driving the charge coupled device delay line.

10. An apparatus for removing jitter in a color signal according to claim 1, in which said reference signal generating means comprises: a crystal oscillator; a $\frac{1}{4}$ frequency divider which frequency-divides the frequency of the output signal from said crystal oscillator into $\frac{1}{4}$, and provides a reference signal to first and second frequency converters which convert the chrominance signal into low or high frequency signals when the color video signal is recorded or played back by said record/play-back means; a 1/1085 frequency divider which frequency-divides the frequency of the output signal from said oscillator into 1/1085 and provides a reference signal to said phase comparator; and a 1/525 frequency divider which frequency-divides the frequency of the output signal from said 1/1085 frequency divider into 1/525 and provides a reference signal to the servo circuit of said record/play-back means; a first logic circuit which is coupled at one input terminal with the output signal from said oscillator; a first counting circuit which is coupled at one input terminal with the output signal of said first logic circuit; means for producing a first pulse from said first counting circuit; means for producing a second pulse in response to the first pulse; a second logic circuit which is coupled at one input terminal with the first pulse and at the other input terminal with the play-back horizontal synchronizing signal and which produces a first logical signal; a third logical circuit which is coupled with the first and second pulses to produce a second logical signal; and a second counting circuit which is coupled at one input terminal with the output signal from said second logic circuit and at the other input terminal with the output signal from said third logic circuit, and applies an output signal to the other input terminal of said first logic circuit and to the other input terminal of said first counting circuit.

11. An apparatus for removing jitter in a color signal according to claim 10, in which said first logic circuit is an OR gate.

12. An apparatus for removing jitter in a color signal according to claim 10, in which said second logic circuit is an AND gate.

13. An apparatus for removing jitter in a color signal according to claim 10, in which said third logic circuit comprises a AND gate.

14. An apparatus for removing jitter in a color signal according to claim 10, in which said first counting circuit is a 1/1085 up/down counter.

15. An apparatus for removing jitter in a color signal according to claim 10, in which said second counting circuit is a 1/N up/down counter.

* * * * *